United States Patent
Vavik

(10) Patent No.: US 8,059,576 B2
(45) Date of Patent: Nov. 15, 2011

(54) SIGNAL REPEATER SYSTEM

(76) Inventor: Geir Monsen Vavik, Jonsvatnet (NO)

( * ) Notice: Subject to any disclaimer, the term of this patent is extended or adjusted under 35 U.S.C. 154(b) by 973 days.

(21) Appl. No.: 10/597,002

(22) PCT Filed: Jan. 10, 2005

(86) PCT No.: PCT/NO2005/000013
§ 371 (c)(1),
(2), (4) Date: Sep. 20, 2007

(87) PCT Pub. No.: WO2005/067164
PCT Pub. Date: Jul. 21, 2005

(65) Prior Publication Data
US 2008/0069025 A1 Mar. 20, 2008

(30) Foreign Application Priority Data

Jan. 9, 2004 (NO) .................................. 20040110

(51) Int. Cl.
*H04B 7/14* (2006.01)
*H04J 1/10* (2006.01)
*H04J 3/08* (2006.01)

(52) U.S. Cl. ............... 370/315; 370/310; 370/310.2; 455/11.1; 455/12.1; 455/13.1; 455/15; 455/17; 455/20; 455/63.1; 455/67.13; 455/402; 455/501; 340/425.1; 340/425.2

(58) Field of Classification Search ............... 455/402, 455/11.1, 12.1, 13.1, 15, 17, 20, 501, 63.1, 455/67.13; 340/310.01, 425.1, 425.2; 370/310, 370/310.2, 315

See application file for complete search history.

(56) References Cited

U.S. PATENT DOCUMENTS

| | | | | |
|---|---|---|---|---|
| 4,879,755 A | * | 11/1989 | Stolarczyk et al. | 725/41 |
| 4,882,765 A | * | 11/1989 | Maxwell et al. | 455/18 |
| 5,295,154 A | * | 3/1994 | Meier et al. | 370/351 |
| 5,408,679 A | * | 4/1995 | Masuda | 455/11.1 |
| 6,253,060 B1 | * | 6/2001 | Komara et al. | 455/9 |
| 6,285,857 B1 | * | 9/2001 | Javitt | 455/15 |
| 6,507,573 B1 | * | 1/2003 | Brandt et al. | 370/335 |
| 6,690,916 B1 | * | 2/2004 | Yenerim | 455/11.1 |
| 6,941,576 B2 | * | 9/2005 | Amit | 725/143 |
| 2002/0075806 A1 | * | 6/2002 | Shalvi et al. | 370/235 |
| 2004/0110483 A1 | * | 6/2004 | Mollenkopf | 455/402 |
| 2004/0242185 A1 | * | 12/2004 | Lee | 455/402 |
| 2005/0020233 A1 | * | 1/2005 | Cern | 455/402 |

* cited by examiner

*Primary Examiner* — Steve D Agosta

(57) ABSTRACT

The present invention concerns analog signal repeater system solutions of the general kind. It concerns in particular stability with analog signal repeater systems.

10 Claims, 6 Drawing Sheets

SIGNAL REPEATER SYSTEM

INTRODUCTION

The present invention concerns analogue signal repeater system concepts of the general type as explained in the preamble of the appended claim 1, as well as analogue signal repeater as described in appended claim.

BACKGROUND

During the last 20 years, analogue, high frequency repeaters in data communication systems have been neglected in favour of digital concepts. Analogue gain may be realised with analogue or digital signal processing methods and are characterised firstly by their full or part transparency. They offer an amplified, analogue representation of the input signal to give a near sustained bandwidth and very low latency even at very large system bandwidths. Digital repeaters are not transparent and are commonly based on just one type of modulation as well as one type of communication protocol, which again is likely to be of proprietary character. The resulting conversion that takes place within them causes high supply current draws and they tend to be of large physical dimensions. In addition each repeater contributes to a substantial reduction of the overall bandwidth of the system and always introduces problematic latencies that either excludes or complicates certain modern, time critical telecommunication services. There are physical limitations as well to which extent technologies within digital repeaters can be developed for large bandwidths. With known semiconductor types there are physical limits to how much it is possible to reduce current consumption at high processing speeds being limited, amongst other factors, by the lower limit of transistor bias and clock frequencies. Such concepts are likewise not inexpensive in production as for instance due to their obligation to utilise the newest and most expensive technology available. Such technologies are therefore likely to be quickly replaced by new generations leading to hi write-off costs. As a consequence, it is too expensive and impracticable to use a sufficient number of such repeaters for, as an example sustaining signal levels on cables or for wireless coverage in an area where line of sight obstructions are significant. There exists therefore a great need of novel solutions that will give repeaters that may be utilised in great numbers and have low productions costs, which have small dimensions and consume low currents. An analogue repeater system may as well be made compatible with any existing, none proprietary communication system and might be prepared for most future ones. Analogue repeaters do not have the disadvantages associated with mentioned digital repeaters. It has been claimed that analogue repeaters as opposed to digital repeaters accumulate noise. These are conclusions with substantial flaws in addition to the fact that digital repeater systems will accumulate noise that gradually reduces symbol bandwidth in addition to the band width reduction being caused by the latency associated with each repeater. It is known from analogue repeaters of old times used in telephone systems that they were able to convey the signals across the globe. With regenerative, super regenerative and super heterodyne analogue repeaters one may obtain regeneration of the signal which among other things is owing to averaging of noise similar to what happens when amplifiers are connected in parallel. The accumulated, systematic noise may be reduced with various measures. A significant number of analogue repeaters may be utilised without substantial degeneration of the signal if the repeater design measures are taken. The advantage of analogue repeaters is their significantly lower power consumption as compared to digital repeaters. This is particularly important when repeaters are battery powered or will have to live off currents flowing in conductors that the repeaters are coupled loosely to, for example by inductive means.

In repeater or transponder systems as given in patent documents NO20001057, NO20010132, NO20020112, PCT/NO01/00079, PCT/NO03/00004 it is shown how analogue repeaters and systems using analogue repeaters may be realised within none optimal cases for both wireless and wire bound concepts or a hybrid of those. Characteristic of such sub optimal cases as when conventional solutions are not applicable, is when sufficient attenuation between input signal and output signal easily does not lend itself to be made larger than the signal gain of the repeater. Consequently it is also characteristic of such cases that there are points along the signal medium where analogue gain is required but where it is impractical to insert the mentioned attenuation. Examples of this are cable connections that cannot be broken up as in power grid networks. One example of wireless applications is when only one antenna can be used or when large distance in the form of a number of wavelengths between antennas cannot be realised. Additional examples of none optimal cases are when isolation between input and output signal is reduced from reflections from various causes. This may be the case for wire bound and wireless systems. In wire bound systems certain control of this may usually be exercised in wireless systems varying reflection parameters are often a larger problem. A one port gain block that is a repeater is stabile only as long as sufficient attenuation is present between the gain block or repeater and the reflection occurring in the system or repeater cascade. There exists therefore a need for novel, simple solutions making it more practicable to meet such challenges. In some cases conventional concepts have applied circulators to attain attenuation of reflections and to obtain directional sensitivity. However, in large scale context this is too expensive and additionally it is often impracticable. Even other types of directional sensitivity may be impracticable to implement. The consequences of insufficient attenuation between input and output signal in signal repetition using frequency transposing is duplex interference.

The consequences under the mentioned, none optimal conditions as a result of reflections or lack of attenuation may be that stability requirements cannot be sustained for signal repetition within the same channel.

When frequency transposing is applied to analogue repeater systems it is often important that a minimum of channels are used for duplex purposes in order to acquire the largest possible efficient symbol bandwidth using the available frequency spectrum in addition to securing channels for two-way communication or multiple channel systems for increasing the available system bandwidth. In this context it is also necessary to be able to allocate neighbouring channels as close to each other as possible. Super regenerative frequency mixers allow very small spacing between input and output channel in a repeater as shown in the publications NO20001057, NO20010132, NO20020112, PCT/NO01/00079, PCT/NO03/00004. There exists a need for novel applications that can economise the use of available, useful channels in such systems. This is particularly important for modern broadband applications. It is also particularly important in wireless applications where frequency band density is heavy. Even more important may this be in cable based systems, especially cables with poor high frequency characteristics where often just marginal frequency regions are available for the symbol bandwidth required now and in the future.

When gain is larger than 1 within the same frequency region for a repeater the stability criteria are important for utilisation of the gain. Reflections and echo from other repeaters play an important role to achieve stability. Phase is affected by the complex impedance that the gain block (amplifier) looks at and by the attenuation between ports of a multiple port gain block Analogue gain has to a large extent been abandoned in modern networks due to the difficult task of combining stability and satisfactory gains. It is especially difficult to make solutions that are both repeatable and possibly producible in large quantities or large systems. Directional attenuation in some form is often the only and the best measure taken against echo and reflections. In some applications attenuation of interference of 10 to 20 dB is satisfactory, but in other applications that require good linearity as with QAM and OFDM attenuation of 30-50 dB is necessary. For some modulation types problems with frequency beating can occur even with relatively large attenuation. Previously published solutions are not able to satisfy attenuation requirements and these solutions are either not practically applicable or have only limited applications as for example in none linear systems, for example frequency modulation for rather limited bandwidths. Therefore it exists a large need for novel, practical solutions that can give repeatable stability combined with required gain and signal to noise ratio. There is a need for such solutions both for signal repetition with frequency transposing and with same channel amplification.

SUMMARY OF THE INVENTION

It is one main object of the present invention to provide solutions that in a low cost and production friendly way secures repeatability, stable operation and maximum signal dynamics for analogue high frequency repeaters in systems specifically for one and two way wire bound digital communication, digital "streaming", digital "multicast", digital return channel for other systems as in digital point to multiple point and all similar systems, but the invention also has important corresponding applications for wireless transmissions. Besides, one purpose of the invention is to keep power consumption low with the help of simplicity in design. An additional object of the invention is for it to be installation friendly. The object of the invention is also to offer redundancy, improved stability and a wider scope of application for the inventions described in the publications NO20001057, NO20010132, NO20020112, PCT/NO01/00079, PCT/NO03/00004. Further objects of the invention are achieved by improvement of the stability criteria for repeaters with gain within the same frequency band both with gains less than port isolation and gain larger than port isolation. A similar object of the invention is achieved with solutions regarding duplex conditions. Still other objects of the invention are achieved with solutions that reduce mutual interference between repeaters, beating between repeaters and interference from echo or reflections. A further object of the invention is to be able to realise practical solutions for directional discrimination and conveying large bandwidths on single conductors like power lines. One object of the invention is also to allow the solutions by the invention to be utilised in an adaptive way where the adaptivity is controlled by local intelligence or by central intelligence. A further object of the invention is to be able to combine several methods of achieving isolation between ports, to reflections and to other repeaters. To a skilled person of the art it will be apparent that other objects of the invention are obvious.

THE INVENTION

Several objects of the invention are achieved, in a first aspect, by a signal repeater system with analogue amplification as given by the attached independent claim.

Further given objects, in subsequent aspects are achieved with analogue signal repeater solutions as given by the subsequent attached claims.

Further, advantageous characteristics are given by the attached dependent claims.

Completely independent of the way in which the first aspect of the invention is realised in detail the principle of the invention can be described as an analogue repeater system for one- and two way digital transmission systems to avoid or reduce satisfactorily echo, reflections and mutual interference between repeaters and thereby make efficient use of available channels. This is especially important for modern broad band applications. It is also particularly important in wireless applications where the density within many frequency bands is heavy. This may be even more important in cable based systems, especially where cables with poor high frequency characteristics offer marginal useful frequency regions for broad band applications. Power grid cables for low- and medium voltage are typical examples where there is a need for two way communication, metering tasks, smarthouse services and other services preferably in combination with IP networking and broad band products. Copper networks for telecommunication are contemporary examples as well, especially in those parts of the world where the existence of old copper networks is substantial. The invention can be related to patent publications NO20001057, NO20010132, NO20020112, PCT/NO01/00079, PCT/NO03/00004 that describe how simple and cost effective frequency transposing can be realised. Here, it is also shown how frequency shifting between repeaters can be utilised to improve system performance with respect to different dynamic properties, robustness against echoes or reflections. These publications additionally show that major advantages in signal dynamics and frequency band separation within the repeaters themselves can be achieved by introducing frequency mixing even with the super regenerative repeater. The super regenerative amplifier is both a frequency mixer and an amplifier. It will, without high frequency selectivity both send and receive within a number of frequency bands with separations equal to the quenching frequency. The number of such bands is given by Q-values together with quench action frequency. A pure, super regenerative repeater as opposed to a locked oscillator or an oscillating amplifier will be transparent for all modulation types and for any signal within the high frequency pass band of the repeater or amplifier. The invention may utilise one or more pilot signals injected at any appropriate point in a signal cascade and in an appropriate part of the applied frequency band to facilitate automatic control of gain in each individual repeater, especially when the high frequency signals contain switching characteristics. The invention makes use of the mentioned factors by being able to utilise just two frequency bands for each channel. This is achieved by repeater 1 frequency shifting from frequency f1 to f2. The next repeater repeats the signal within the same frequency band f2. The next repeater will frequency shift to f1. Further on the sequence repeats itself. In this way echoes in one repeater from a different repeater is avoided because the gain in each individual repeater is substantially less than the attenuation between three repeaters. The invention can perform correspondingly for a second information channel, possibly in a second signal direction for example in an asymmetrical or symmetrical system or system that requires two channels by utilising frequency bands f3 and f4. For asymmetrical systems with low return bandwidth one frequency may be sufficient if low carrier frequencies with low attenuation are used. But a second, for instance a higher frequency can advantageously be applied at a certain physical point to allow signal return to a central unit in case this unit is surrounded by high noise level. In this latter case the invention allows frequency shifting back to the low frequency again if this is desirable for practical reasons.

When determining the physical distance and position for repeaters generally is at liberty as in the cases of open power lines or their associated ground lines the invention permits the introduction of added isolation in the same frequency channel by making every second distance between repeaters larger causing a resulting, additional useful attenuation which is conveniently combined into isolation and required signal dynamics.

One example of repeater is described in patent publications NO20001057, NO20010132, NO20020112, PCT/NO01/00079, PCT/NO03/00004 is a double, super heterodyne repeater where there exists a signal intermediate frequency which is favourable as a common intermediate frequency together with an adapter for a wireless or other high frequency based modem as for example a IEEE802.11x node, Docsis node or other type node. The invention facilitates bi-directional mixing of the microwave frequency of the wireless modem into this intermediate frequency in such a manner that a modem or a node is connected at any point where there is a repeater of the type referred to and that matches this intermediate frequency. The invention also describes an adapter solution where in addition to frequency converting a bypass signal path is arranged using any kind of stop frequency band arrangement for the frequency converted frequency band to achieve acceptable duplex specifications. To improve upon duplex characteristics for high requirements in dynamics the invention can utilise triple- or higher order super heterodyne, thus allowing receiver and transmitter having different intermediate frequency to avoid local oscillators reducing dynamics.

Completely independent of the way the invention in it's subsequent aspects is realised in detail the principle of this can be described as a novel method of achieving isolation between input signal and output signal for a repeater with antennas or coupling arrangements as well as avoidance of reflections back to the repeater. This is achieved in the invention using two repeaters that repeats within the same frequency band but where the two repeaters have different frequency bands for the two signal directions. In addition the invention applies opposite antenna polarisation or coupler polarity or different cable conductor for the respective signal directions Microwave radio applications can advantageously apply circular polarisation. The invention is applicable to radio applications where the repeaters should draw low currents likewise it is suitable for repeater with the Lecher wire principle. One example of use of the invention with the Lecher wire principle is on open power lines, air mounted ground wires in power transmission lines and two-way microwave signals on such lines and where the purpose is to achieve wide bandwidths. Still another object of the invention is a novel method of achieving directional attenuation and two way transmission with relatively very large bandwidths across relatively large distances on single conductors, especially open power transmission lines that carry from several kilovolts and up to Megavolt or mast mounted ground lines in connection with such power transmission lines with the help of compact, practical, analogue repeaters. The invention is used on a single conductor, for example a power line of the bare metal type, which is thereby used as a waveguide according to the Lecher wire principle. A standard definition of a wave guide is a dielectric medium constrained or encapsulated by a conductive surface or a material that constitutes a dielectric contrast as opposed to a transmission line which is likely to have open barriers. A Lecher wire is a combination of a transmission line, a waveguide and a wandering wave antenna in that it has an open barrier, for example metal to space. Even though it is similar to an antenna, it exhibits low radiation losses as long as the wavelength is short. Any metallic conductor without insulation layer or with thin insulation layer or with insulation layer with a low loss angle may act in a way that resembles a wave guide with very low losses for short wavelengths all the way up the millimeter wave regions. One such example of application of the invention using Lecher wire principle is on open power transmission lines and transmission of two way microwave signals on such lines and where the object can be to achieve very wide digital bandwidths. With such applications it is important with low power consumption because the currents carried in such power lines have large dynamics and may be down to a few amperes in which case it is difficult to achieve enough induced energy for powering repeaters requiring much energy. At higher voltages it may be possible to use capacitively coupled energy off the power transmission line to power the repeaters. This is also the case when the repeaters are installed on the ground wire or ground wires. To facilitate the use of more compact and energy efficient analogue repeaters it is a requirement that problems associated with echo, reflections and directional dampening is solved while efficient excitation of signal power to the signal medium is made possible at the same time as coupling of signal from the signal medium for best signal to noise ratio is possible. An embodiment of the invention is to regard it as a part radio system and the repeater technology of the invention must therefore satisfy some of the most stringent coexisting regulations that exists today and can be expected in the time to come. Solutions for such repeaters are shown in patent publications NO20001057, NO20010132, NO20020112, PCT/NO01/00079, PCT/NO03/00004.

The invention in one embodiment has in a given repeater point two repeaters in the same frequency band where the repeaters satisfy today's coexistence requirements and where the two repeaters utilise different frequency bands for the two signal directions. In addition the invention can apply opposite antenna polarisation for the different signal ports. Polarisation may be circular or linear and may be in the form of antenna; antenna element or probe and a reflector can be used. In one embodiment the repeaters can be installed on different conductors of a power transmission line to separate the two signal directions. Probing and excitation by the help of the "antennas" is relatively none critical whereas the coupling element does not have to be too close to the conductor but in fact may be installed with a practical spacing to the conductor allowing the coupling element to be looking along the conductor line. The coupling elements will look in the respective directions from the repeaters. In this way it is possible to install repeaters that do not make direct galvanic contact with the high voltage conductor.

The invention may correspondingly be made into an embodiment that utilises frequency-shifting repeaters. Suitable repeaters for this object of the invention are also described in the patent publications NO20001057, NO20010132, NO20020112, PCT/NO01/00079, PCT/NO03/00004.

An independent embodiment of the invention can be described as a novel method to achieve directional dampening, dampening of reflections and two way transmission of relatively very large bandwidths on cable infrastructures, in particular ground buried cables and air mounted cables for low voltage power grids as well as separate conductors with from low voltage to several kilovolts using galvanically coupled analogue repeaters that preferably are placed within junction boxes, transformer sub stations and other types of junctions. In this invention, direct coupling through large capacitances or inductances is regarded as galvanic or as direct coupling. The typical embodiment of the invention uses differential input or output couplers with respect to common mode noise for both immunity and emission characteristics of the signal system. Embodiments of the invention utilise differential input and output signal couplers in systems with two conductors and in systems with more than two conductors as well as in systems that encompass ground or neutral conductor. The invention makes use of any given point on a cable where the conductors are accessible either implicit or by simple measures taken where between two terminals it may be regarded to exist a two port consisting of three parts, two ports with a transfer function between them. The transfer function may be given by the conditions each separate conductor possesses and where the point can consist of one or more junctions, distributed capacitance and various loss functions. This occurs correspondingly with two conductors or for two conductors in a three conductor system and so on further without serious effects to the use of two or more conductors in differential circuits. The invention makes use of altering the magnetic field around the conductor preferably by the use of toroids that in most cases allow practical fitting around each conductor. The invention utilises advantageously toroids of magnetic material. But the invention also makes it possible to use toroids of dielectric materials since materials with very high dielectric constants have been made commercially available. Dielectric materials will not have the same drawbacks as magnetic materials concerning high current levels where none linearity and saturation may cause a problem. The toroid efficiency is increased by increasing the toroid length or by stacking toroids together. In the invention a single conductor with a junction may consist of three separate toroids, in a three phase cable system with a single phase junction it may consist of 8 toroids. A two pole of the invention may be decomposed into separate impedances that can be simulated with computer aid. A single conductor with junction through a typical junction box in a low voltage grid system will typically show 12 dB or more isolation between any of the "ports" using galvanic coupling. Without toroids the isolation will be limited to around 6 dB. With regard to a reflection this means an isolation of 24 dB and an improvement of 12 dB. The invention will show some lower isolation figures with air mounted cables. By introducing additional high frequency impedances between the ports, preferably consisting of a capacitor in series with a low resistance value the figures are usually improved by several dB. With a purely reactive component between the poles of the ports harmful reflections are a risk.

An independent embodiment of the invention can be described as a novel method of achieving directional dampening, dampening of reflections and two way transmission of relatively very large bandwidths on cable infrastructures, in particular ground buried cables and air mounted cables for low voltage and up to a few kilovolts with single conductors with the help of none galvanic coupled analogue repeaters that preferably are installed in junction boxes, transformer sub stations and other types of junctions. Coupling through inductive loops or capacitances of low values or combinations of these are regarded as none galvanic or none direct coupling in the invention. A combination of galvanic and none galvanic coupling with repeaters is regarded as part of this novel aspect of the invention. Differential input and output coupling is utilised in the invention in most cases with respect to common mode noise related to immunity and emission characteristics of the signal system. The principle of the invention with galvanic coupling is a coupling conductor loop where one part of the loop is carried in a certain length very close to the cable conductor to which the coupling is intended. If the cable conductor and the nearby loop conductor are carried through a toroid of magnetic or dielectric material, the coupling efficiency is increased. The coupling arrangement of the invention may be made more efficient by making the respective loop conductor into a few turns through the toroid. Still more improvement of the coupling in the invention results by stacking a number of toroids that the cable conductor and the loop conductor pass through. For higher frequencies and when less attenuation between cable terminals is required the magnetic or dielectric material may take a different form or may be omitted completely. Using these various methods in the invention allow sufficient coupling for achieving coupling efficiency equivalent to galvanic coupling even down to frequencies of a few Megahertz. Differential coupling using two cable conductors is achieved with corresponding arrangement on the second cable conductor and allowing the loop conductor to be routed through both toroids. Multiple phase connection embodiments are realised in a corresponding manner. One simple form of matching may be achieved with a resistance in series inside the coupling loop. The invention can make use of any phase combination and this function may be programmable or adaptive for example using a simple circuit with a selector. In a coupling arrangement using two cable junctions two separate coupling loops will typically offer better than 20 dB isolation between the coupling loops, in optimised cases, for example using additional termination impedance, better than 30 dB isolation between the coupling loops may be achieved in the invention across a wide frequency region from high frequency to well into the VHF frequency region. The invention gives isolation between cable junctions on high frequency of 12 to 20 dB depending on the impedance in the middle of the circuit. Correspondingly the invention offers isolation between all coupling loops when there are more than two such, for example as with three cable junctions using three none galvanic couplings. For three such loops the isolation is still better than 20 dB between any of the three loops or ports. The invention facilitates combination of galvanic and none galvanic coupling, for example by the use of galvanic coupling for one signal direction carrying the lower frequency region where none galvanic coupling is less efficient.

SHORT DESCRIPTION OF FIGURES

The present invention is described in more detail in the following with examples and references to the appended drawings, where FIG. 1 shows with block diagram how repeater frequencies are arranged in relation to dampening between repeaters and signal directions.

DETAILED DESCRIPTION

Figure 1:
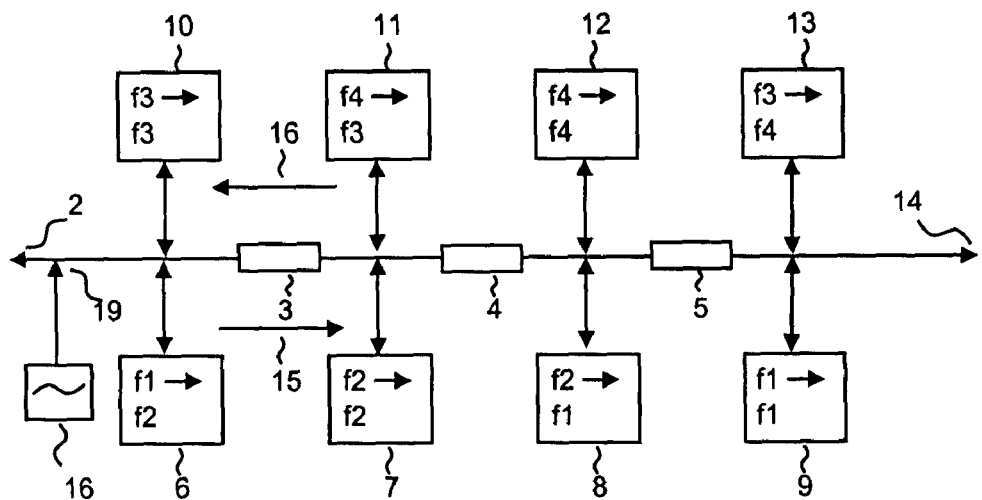

FIG. 1 illustrates how the invention in a repeater system 1 or a repeater cascade 1 makes use of frequency transposing repeaters where isolation against echo between repeaters is made redundant by the use of three frequency bands, f1, f2, f2 for each information channel, possibly each signal direction in use. The figure shows in more detail how the invention makes use of a repeater cascade 1 with the help of frequency transposing repeaters 6, 8 in combination with repeaters that amplifies within the same channel 7, 9 by applying only two frequency bands, f1 and f2 for on and the same information channel. This is achieved in a symmetrical system by repeater 6 frequency shifting from frequency f1 to f2. The nest repeater 7 repeats the signal within the same frequency band, f2. The next repeater 8 repeats by frequency shifting to f1. Further on the sequence is repeated starting with the subsequent attenuation 5 and repeater 9. In this way echo for example into one repeater 6 from a different repeater 8 is avoided because the gain in each individual repeater 6, 7, 8 is substantially lower than the attenuation 3, 4 between three repeaters. This results in optimal signal dynamics. Correspondingly the invention facilitates the same method to be used in the opposite direction 16 in an asymmetrical or symmetrical system or system that needs two information channels by utilising repeaters 10-13 for the frequency bands f3 and f4. One or more pilot signals 16 can be inserted in one or more points 17 in the signal cascade 2, 14 to ease automatic adjustments of the gain in each repeater 6-9, 10-13. When the liberty to determine freely the physical distance and position for repeaters is available as is the case on open power transmission lines or ground lines in such systems, the invention allows the insertion of an additional 20 dB isolation in the same frequency channel by making every other distance between the repeaters larger to result in approximately 20 dB additional attenuation. About 20 dB reduction of transmission power is allowable without causing undesired effects, therefore the invention can be realised in such a way that every other repeater has an output level of for example 0 dBm while correspondingly every other repeater has −10 dBm. Alternatively, the difference in output power may be adjusted automatically with AGC arrangements possibly by the help pilot signals between the repeaters.

Figure 2:
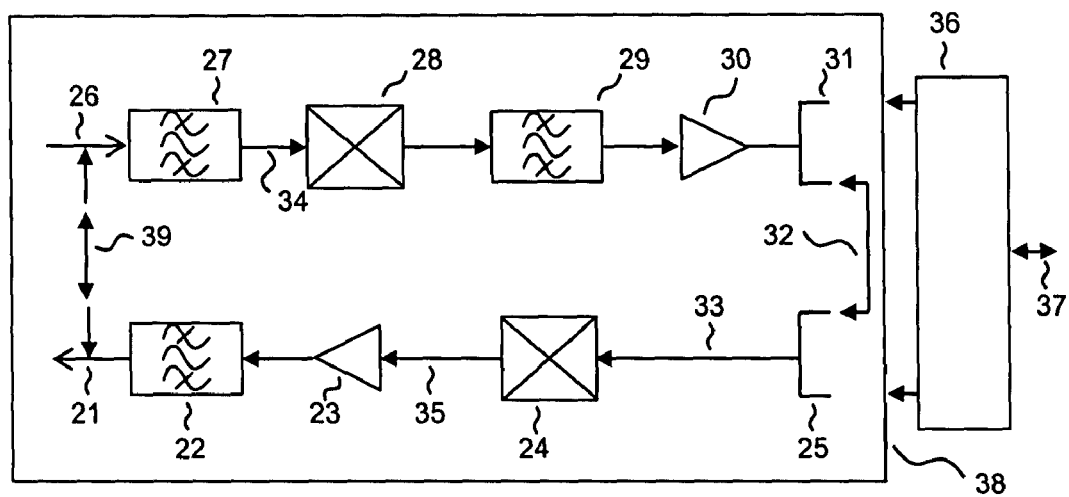
FIG. 2 shows an example of an analogue repeater employing the double super heterodyne principle and one intermediate frequency that advantageously has a centre frequency of several hundred Megahertz.
Figure 3:
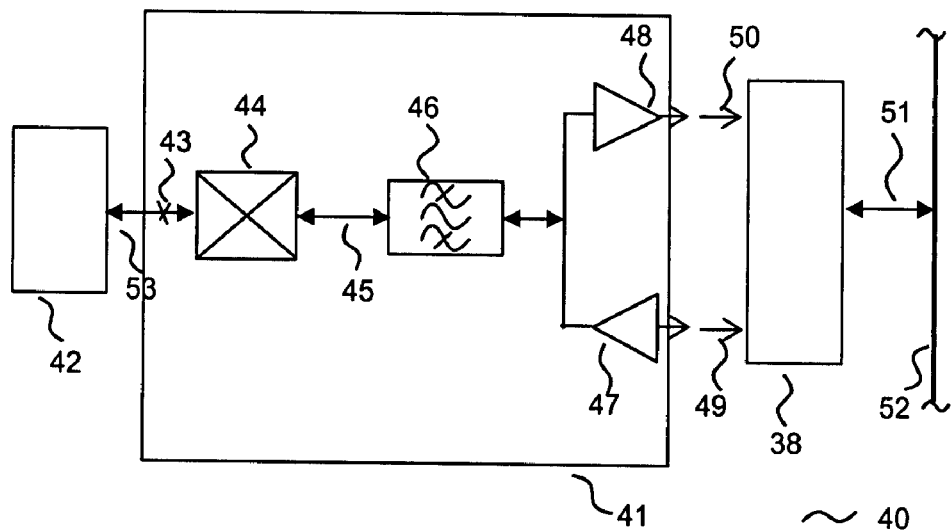
FIG. 3 shows how an adapter can be arranged between a modem and a repeater using intermediate frequency as shown in FIG. 2.

In FIG. 2 is shown an example of repeater as described in patent publications NO20001057, NO20010132, NO20020112, PCT/NO01/00079, PCT/NO03/00004 which is a double or multiple super heterodyne repeater 38 where in the invention it is arranged with a signal intermediate frequency 33 being suitable for adaptation to an analogue repeater 38 using for example a common intermediate frequency 25, 31 with an adapter 36 for wireless modem or other commercially available modem or network node 36 which may be a IEEE802.11x node or modem 36 or Docsis node or modem 36. The invention may also be used for symmetrical modems that can be interconnected back to back almost anywhere in the system and independently of which modulation or protocol the system is using in such a way that the invention facilitates the use of differing, standardised modulation types and protocols within one and the same system, for example to achieve adaptive qualities and longer range in a low cost manner in parts of the system, possibly with the penalty of reduced bandwidth in parts of the system. If such modems use base band a modulator and demodulator is required, preferably of the I/O type, and inserted in connection with the adapter 36 if higher frequency bands are to be used for the transmission between the back to back modems. Such typical modems are DSL modems, for example HDSL The invention also encompass viable corresponding arrangements using super regenerative repeater 38 which eventually would use intermediate frequency 25, 31 with the help of the super heterodyne principle. The repeater may be interconnected in the cascade as a two port through circuits 21, 26 or as a one port with the aid of the circuit 39. In FIG. 3 it is shown how the invention facilitates bi-directional frequency mixing in an adapter 41 with signal frequency 43 that may be a microwave signal frequency 43 of a commercially available type network node 42, which may conveniently be a wireless modem 42, to this intermediate frequency whereby such a modem 42 or a node 42 or PC adapter 42 can be connected at any point 51 where a repeater 38 of the type described in FIG. 2 is present and which contain frequency corresponding to intermediate frequency 45, 49, 50. The repeater 41 is connected at any point 51 in an analogue signal cascade 52. Bi-directional frequency conversion can be applied using a bi-directional frequency converter 44 such as a diode ring mixer, still simpler bi-directional diode mixers or as two separate frequency mixers. Additionally, gain 48, 49 can be included in the invention. If the node 42 does not have a removable antenna 53, the connection between adapter 41 and node 42 can be satisfied using a loose coupling 53 to the antenna corresponding to signal point 53.

Figure 4:
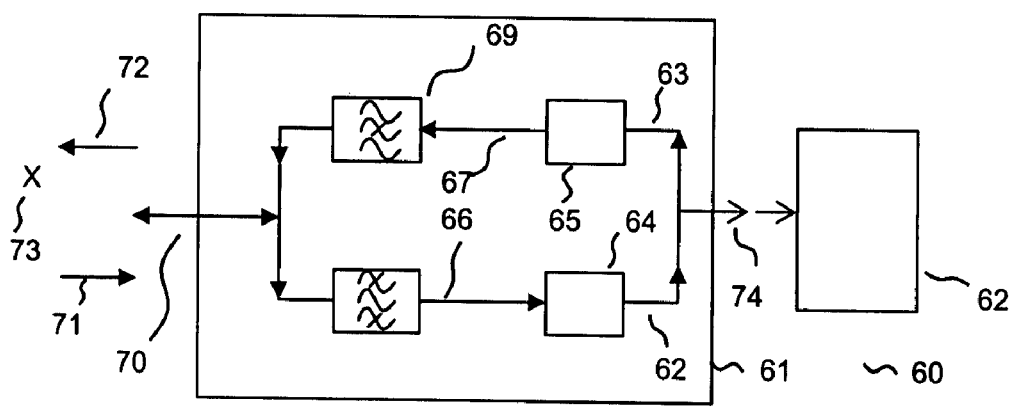
FIG. 4 shows how an adapter can be arranged between a signal point and a modem for independent downstream and upstream channels.

In FIG. 4 one arrangement of the invention is shown with an adapter solution 61 corresponding to the one in FIG. 2. Here it is shown how the invention in addition to frequency converter 64 using level adapting characteristics facilitates the arrangement of a bypass signal path 63, 65-69, with or without frequency conversion, for return signals 63 using a stop filter 69 for the available frequency band in the forward direction 62 to achieve acceptable duplex characteristics.

Figure 5:
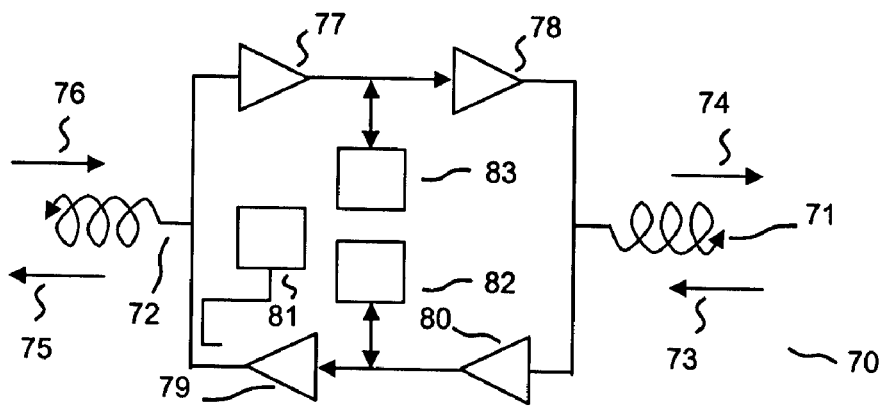
FIG. 5 shows how bi-directional, often one port repeaters can be arranged so that unwanted coupling and reflections are reduced by the aid of unidirectional amplifiers and inverted antenna polarisation.

In FIG. 5 a novel method of combining 70 bi-directional gain with isolation between input signal and output signal 73-76 is accomplished for a repeater 70 with antennas 71, 72, antenna like couplers 71, 72 or other types of couplers 71, 72 as well as avoidance of reflections back to the repeaters 82, 83. This is achieved in the invention using two frequency bands with two repeaters 82, 83 that repeats within the same frequency bands 74-76, 73-75 but where the two bi-directional, conveniently one-port repeaters 82, 83 have differing frequency bands for the two signal directions 74-76, 73-75. In addition, the invention can utilise separate amplifiers 77-80, 78-79 for added isolation for input and output signals 76-73, 75-74 and opposite antenna polarisation, differing coupler polarity or differing cable phases for the differing signal directions 73-74, 75-76 or for the differing ports 74-76, 72-75. For radio or applications similar to radio, circular polarisation may conveniently be used. The repeater arrangement can carry built in radio interface 81 of any type preferably one with low current draws and in which analogue technology described in patent publications NO20001057, NO20010132, NO20020112, PCT/NO01/00079, PCT/NO03/00004 can be applied. The radio interface can be two-way and can be used as a none galvanic coupling to the outside world which typically will be another radio unit at close range. The invention is suitable for radio applications where the repeaters 70 is to consume little energy, similarly it is suitable for repeater 70 on conductors that are brought to act according to the Lecher wire principle.

Figure 6:
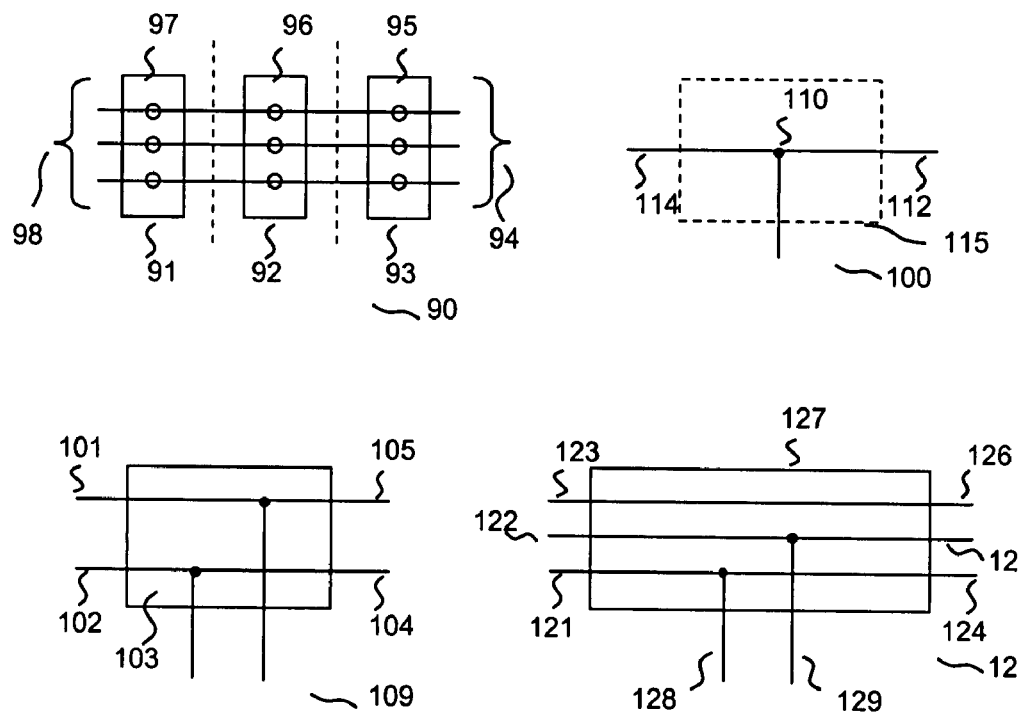
FIG. 6 shows how in the invention any point on a cable where conductors are accessible either implicit or through simple measures between two different junctions can be regarded as consisting of a two port made up of three parts.

FIG. 6 shows that the invention can make use of the fact that any physical point on a cable where conductors are accessible either implicit or through simple measures between two junctions can be viewed as consisting of a two port 90 consisting of three parts 91, 92, 93, two ports 98 and 97, 94 and 95 including a transfer function 92 between them. The transfer function 92 can be given by the properties of each conductor 114 where the point 110 can consist of one or more junctions, stray capacitance, inductance and various loss functions. Correspondingly is provided for two conductors 109, 101, 102 or for two conductors 121, 122, 123 in a three conductor system 120 and so on and without significant affect on the use of two or more conductors in differential couplings.

Figure 7:
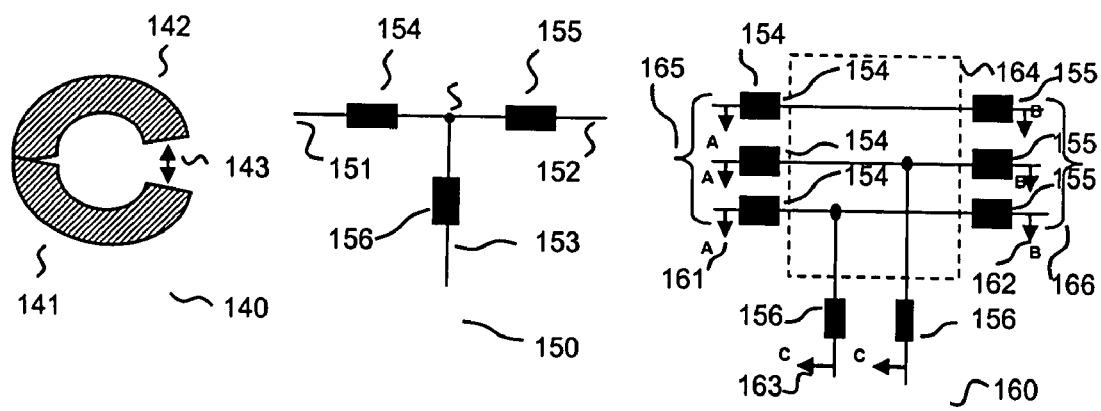
FIG. 7 shows that the invention makes use of altering the magnetic field around the conductor preferably by installing toroids on each individual conductor.

FIG. 7 shows that the invention makes use of changing the magnetic field around the conductor preferably by toroids 140, in most cases being practicably installable 141, 142, 143 on each conductor 154, 155, 156. The invention can advantageously make use of toroids of magnetic materials. But it is also possible to use toroids of dielectric material since materials with very high dielectric constants have become commercially available. With respect to toroids the effect is increased by increasing the toroid length or by stacking a number of toroids. In the invention each conductor 150 with a junction will consist of three separated toroids 154-156, for a three phase cable system 160 with a one phase junction 163 the invention will typically consist of 8 toroids.

Figure 8:
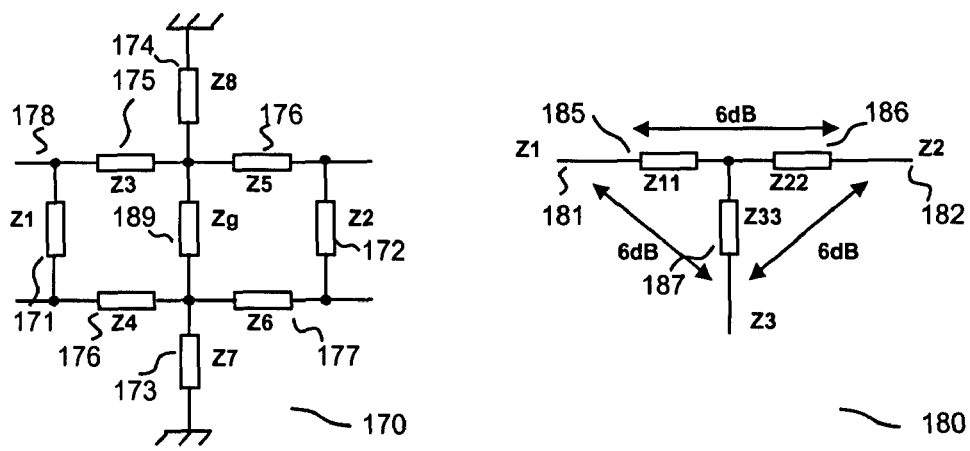
FIG. 8 shows that a two pole in accordance with the invention may be decomposed into different impedances. A single conductor with a junction in a typical junction box is shown with respect to dampening.
Figure 8:
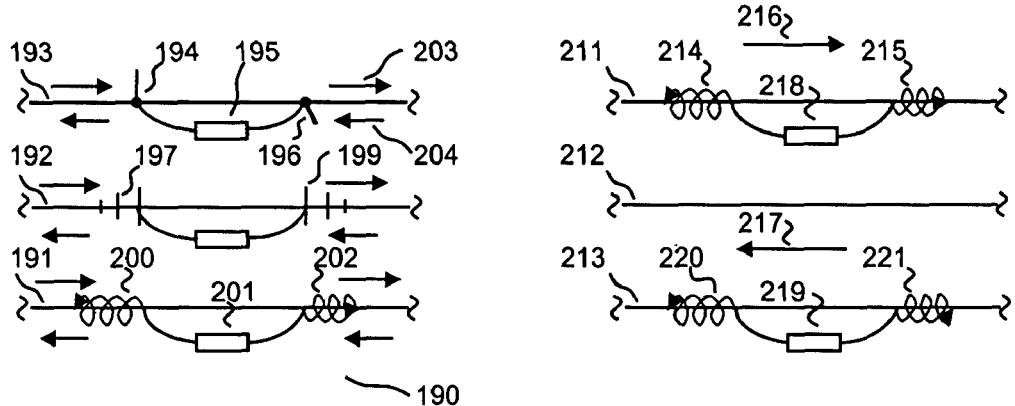

FIG. 8 shows that a two pole according to the invention may be decomposed into various impedances 170, Z1-Z9 that may be simulated using computer. A single conductor 180 with a junction though a typical junction box within a power grid system will typically exhibit 12 dB or more attenuation between any of the "ports" using galvanic coupling. Without toroids the attenuation will be limited to around 6 dB. For a reflection this means a dampening of 24 dB and an improvement of 12 dB. The invention will exhibit somewhat lower attenuation with air mounted cables. By inserting an extra high frequency impedance in Z9, 170, between the ports, preferably consisting of a capacitor in series with a low resistance value, these figures are usually improved by several dB.

Figure 9:
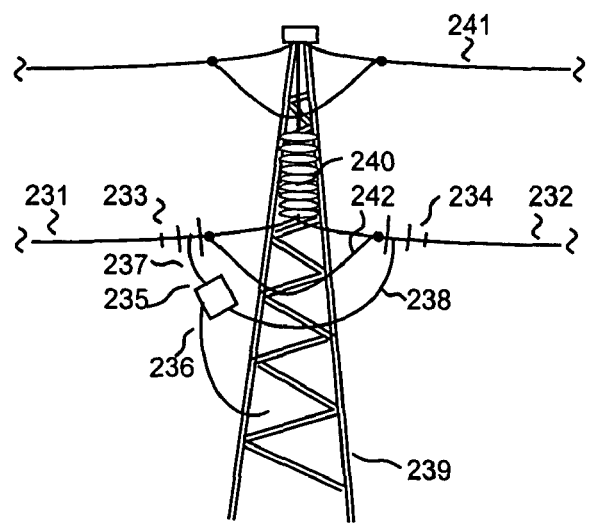
FIG. 9 shows repeaters for two way transmission of relatively very large bandwidths across relatively long distances on single conductors, mainly power transmission lines.

FIG. 9 shows repeaters 195, 198, 201, 218, 219, 235 preferably for two way transmission of relatively large bandwidths across relatively long ranges on single conductors 191-193, 211-213, 232 especially on open power lines that carry from a few kilovolts and up to Megavolts or mast mounted ground lines in connection with such power lines using compact, practical analogue repeaters. This then concerns also when the repeaters are installed on the ground line 241 or ground lines 241. The invention in one realisation can in a given repeater point 190, 210, 230 two repeaters in each unit 195, 198, 201, 218, 219, 235 that repeats within the same frequency band where the repeaters within each unit 195, 198, 201, 218, 219, 235 satisfies today's coexistence requirements and where the two repeaters utilise differing frequency bands for the two signal directions 203, 204.

In addition the invention can apply opposite antenna polarisation 194-196, 197-199, 200-202 for the differing signal ports. The polarisation can be circular or linear and be in the form of an antenna 194, 196, 197, 199, 200, 202, antenna element 194, 196, 197, 199, 200, 202 or probe 194, 196, 197, 199, 200, 202 and a reflector can be used. In one embodiment of the invention the repeaters can be installed on different conductors 211, 213 in a mast power line system to better separate the two signal directions. Correspondingly one embodiment of the invention can be arranged to utilise frequency shifting repeaters 195, 198, 201, 218, 219, 235. Suitable repeaters for the purpose is also described in patent publications NO20001057, NO20010132, NO20020112, PCT/NO01/00079, PCT/NO03/00004.

Figure 10:
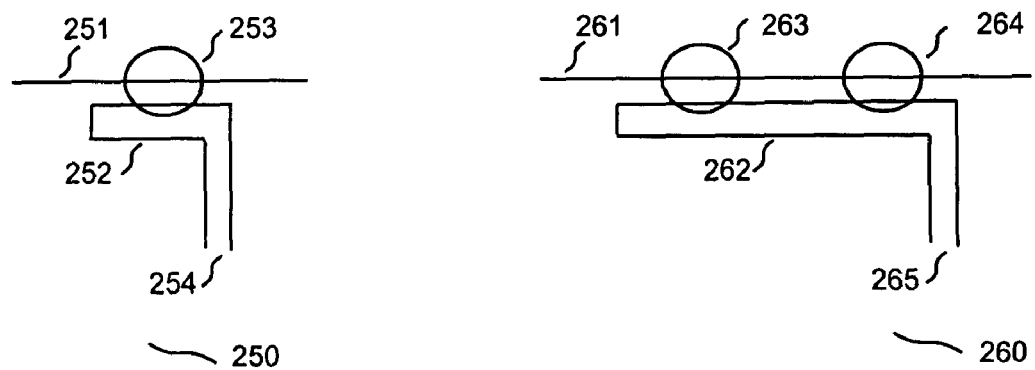
FIG. 10 shows the principle of the invention for none galvanic coupling.

FIG. 10 shows that the principle 250 of none galvanic coupling of the invention is a coupler conductor loop 252 where the one part of the loop is lead at a certain length very close to the cable conductor 251 to which coupling is intended. If the cable conductor and the closest loop conductor is carried through a toroid 253 of magnetic or dielectric material the coupling is increased. The circuit arrangement 250 of the invention can be made still more efficient by the referenced loop conductor 252 being wound as a few turns around the toroid 253. Still more improvement of the coupling 260 results when in the invention a number of toroids 263, 264 are stacked and where the cable conductor 261 and the loop conductor 262 are passed through the stacked toroids.

Figure 11:
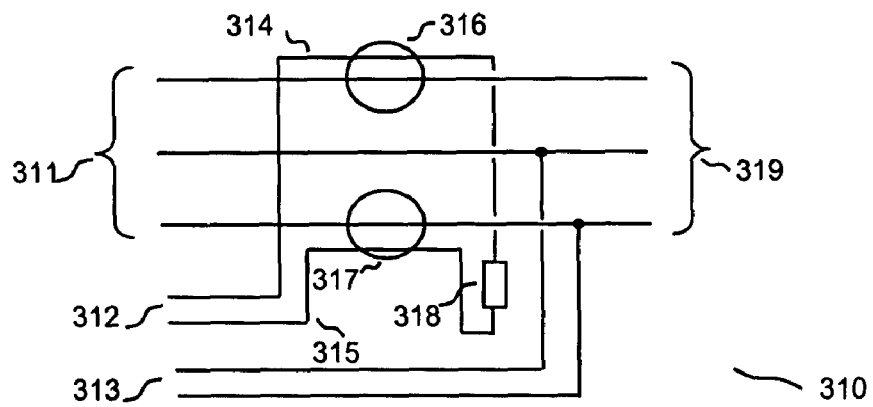
FIG. 11 shows differential coupling with two cable conductors.

FIG. 11 shows that differential coupling in the invention using two cable conductors is achieved by employing a corresponding arrangement on the other cable conductor and making the loop conductor 314 pass through both toroids 316, 317 in the same manner. Multiple phase couplings can be realised correspondingly. A simple form of matching is achieved using a resistance 318 in series with the coupler loop 313.

Figure 12:
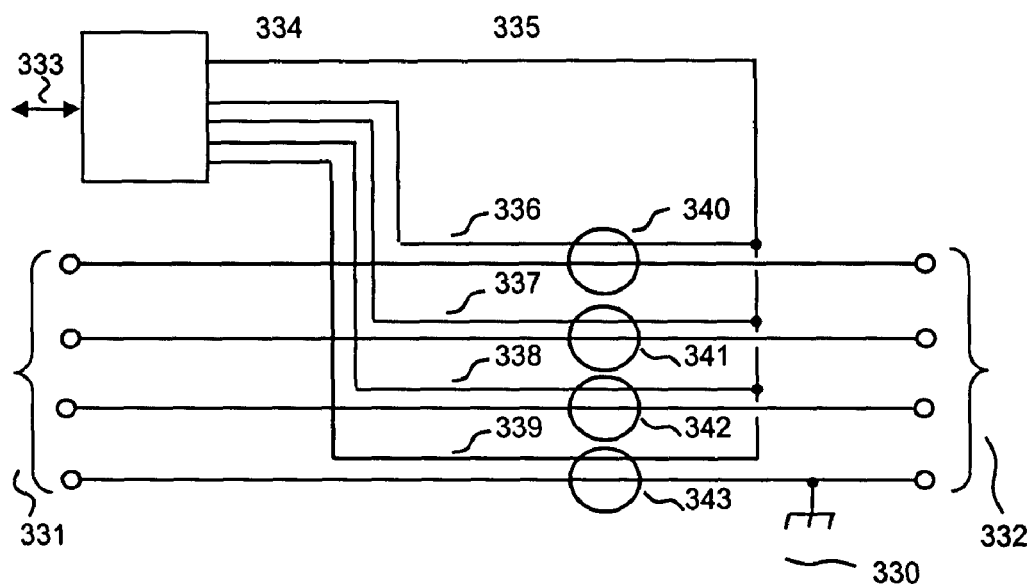
FIG. 12 shows how any combination of phase can be programmable or adaptive for example through a simple circuit using a selector.

FIG. 12 shows that the invention can make use of any phase combination 330 and this may be programmable or adaptive for example by using a simple circuit with a switch 334 for example by using a common coupler loop conductor 335.

Figure 13:
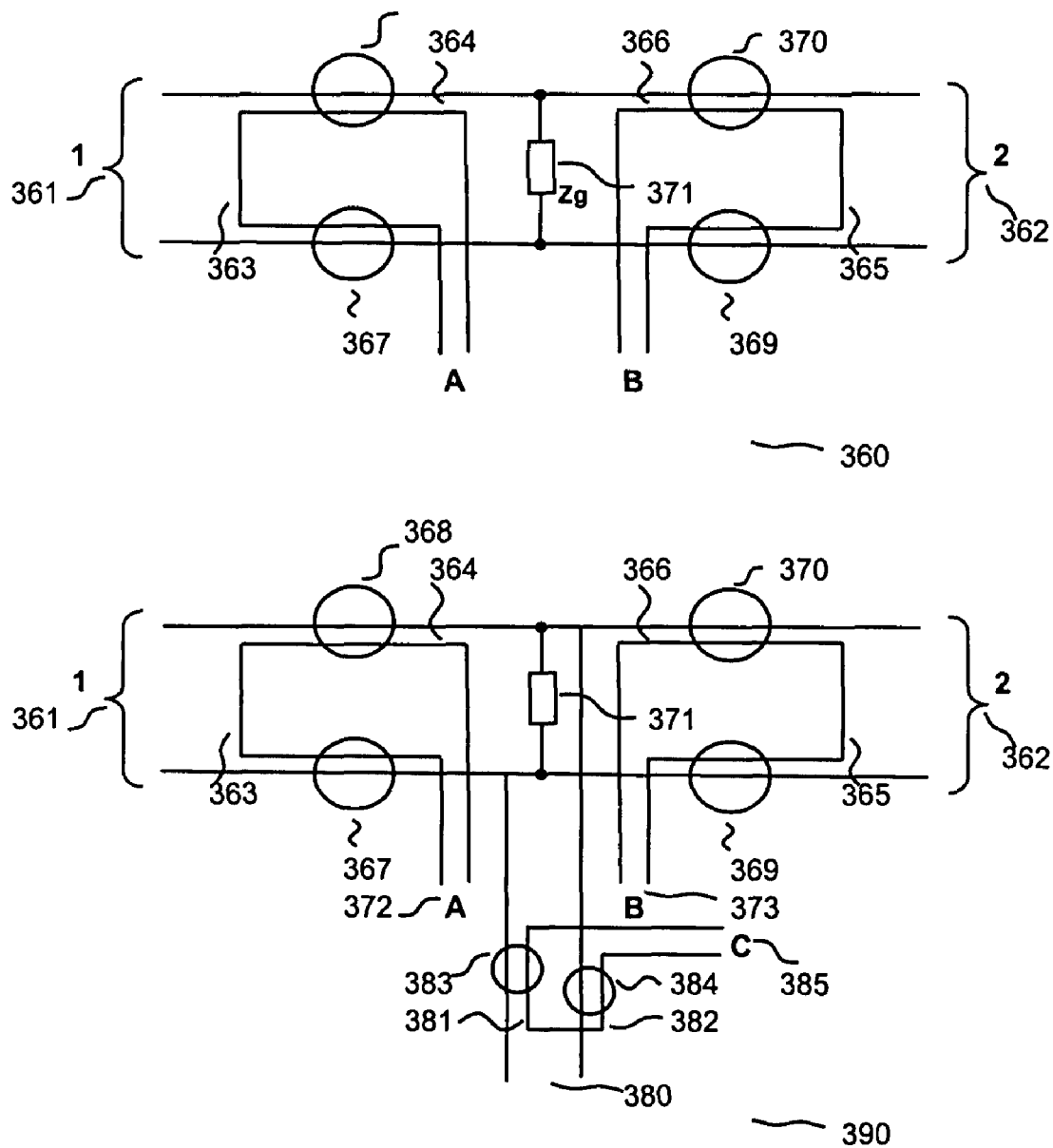
FIG. 13 shows a coupler arrangement with two cable junctions with high attenuation between the coupler loops. Correspondingly it shows an arrangement that exhibits equally large attenuation between any of the three coupler loops.

FIG. 13 shows a coupler arrangement 360 with two cable junctions 361, 362 with two separate coupler loops 363, 365 with increased mutual attenuation between coupler loops 363, 365 that can be optimised using an additional load impedance inserted in the middle of the circuit in addition to the implicit 371. Correspondingly 390 the invention gives isolation between all coupler loops 363, 365, 381 when there are more than two such coupler loops, for example as in the case of three cable junctions 361, 362, 380 using three none galvanic couplers. The invention makes it possible to combine galvanic and none galvanic coupling, for example by using galvanic coupling for one signal direction carrying the lowest frequency content where none galvanic coupling is less efficient and where the galvanic coupling can be made on the terminals 361, 362.

The invention claimed is:

1. Analog signal repeater system used in a power grid and distribution system where repeaters with signal gains are applied to extend radio frequency transmission range across a number of termination cable junction arrangements in different physical positions with cables interconnecting them for stable utilization of repeater gains and for bandwidth improvement as a function of transmission range, comprising:

the signal repeater system with repeaters connected through differential signal couplers consisting of at least one signal coupler arrangement and at least two series impedances and at least one shunt impedance; whereby at least one signal transmission range is facilitated to accept radio frequency gains at the junctions, wherein at least two of the electrically accessible junctions include at least one repeater at each of said junctions, where signal couplers on cables of the junctions facilitate signal bypassing of the junctions and where the combination of transfer losses and inserted dampening in each of the junctions between signal couplers at each of the junctions increase signal isolation between ports of the repeaters at the junctions to mitigate problems from undesired signal coupling between ports of the repeaters.

2. Analog signal repeater system according to claim 1, further comprising the system to be using one of said repeaters for each transmission direction at each of said junctions and where said repeaters are using at least different frequency bands for said transmission directions in each repeater point to achieve duplex and signal transmission in more than one direction across said signal transmission distance enabled by the signal dampening in the junctions.

3. Analog signal repeater system according to claim 1, wherein
said frequency bands being used by said repeaters to employ frequency conversion enabled by the signal dampening in the junctions.

4. Analog signal repeater system according to claim 1, further comprising an adapter connected to at least one of said repeaters allowing equipment with standardized modulation and protocol that include duplex system standards as in Docsis cable modem standards enabled by the signal dampening in the junctions.

5. Analog signal repeater system according to claim 1, wherein
the repeaters at the junctions are using two frequency bands using two of said repeaters in at least one repeater point where said repeaters each repeat signals on the same frequency in one of said frequency bands to provide full duplex transmission enabled by the signal dampening in the junctions.

6. Analog signal repeater system according to claim 1, further comprising
at least one of said repeaters with said two way transmission to be interfaced to two-way wireless communication device enabled by the signal gain at the junctions.

7. Analog signal repeater system according to claim 1, wherein
the said isolation between ports in electrically accessible physical points consisting of conductor junctions is increased using toroids with magnetic material on at least two conductors while differential signal couplers are connected galvanically through capacitors to at least two conductors on the cable side and while at least one capacitor differentially provides a high frequency low impedance shunt impedance for at least two conductors on the junction side.

8. Analog signal repeater system according to claim 1, wherein
at least one junction is utilizing a single conductor for signal transmission in at least one direction between at least two of said repeaters enabled by the signal dampening in the junctions.

9. Analog signal repeater system according to claim 1, wherein
at least one junction is using at least one conductor for additional signal bypass enabled by the signal dampening in the junctions.

10. Analog signal repeater system according to claim 1, wherein
the said isolation between ports in electrically accessible physical points consisting of conductor junctions is increased using toroids with magnetic material on at least two conductors while differential signal couplers are connected to a wire looping through said toroids on at least said two conductors on the cable side and while at least one capacitor differentially provides a high frequency low shunt impedance for at least two conductors on the junction side.

* * * * *